Figure 1:
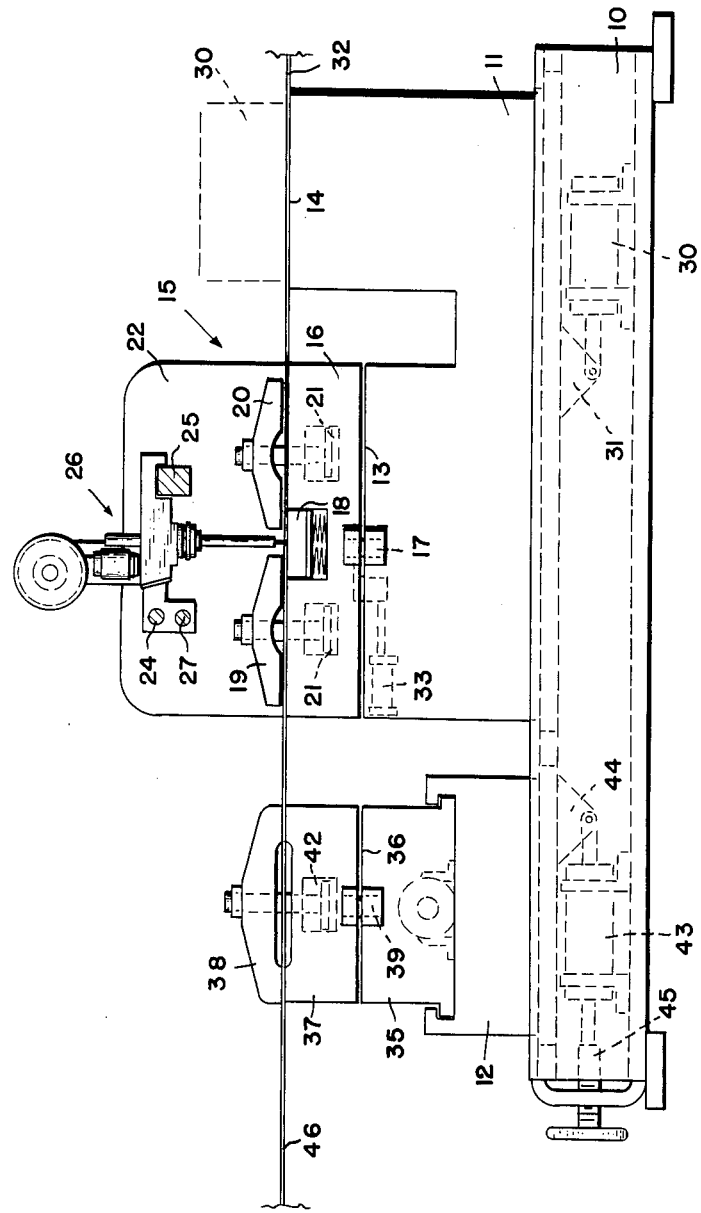

Aug. 3, 1965  J. H. COOPER  3,198,413
APPARATUS FOR JOINING METAL STRIP
Filed Feb. 12, 1962  2 Sheets-Sheet 1

INVENTOR.
JOSEPH H. COOPER
BY Francis J. Klempay

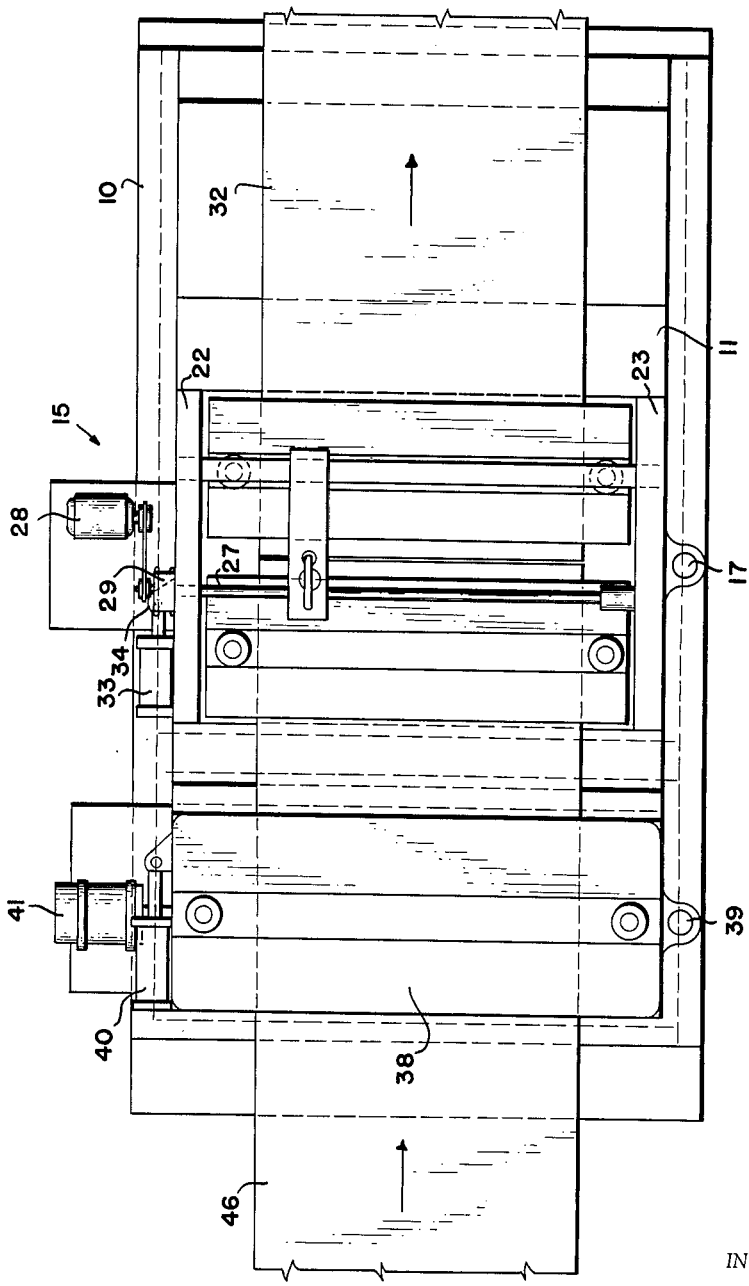

United States Patent Office 3,198,413
Patented Aug. 3, 1965

3,198,413
APPARATUS FOR JOINING METAL STRIP
Joseph H. Cooper, Warren, Ohio, assignor to The Taylor-Winfield Corporation, Warren, Ohio, a corporation of Ohio
Filed Feb. 12, 1962, Ser. No. 172,826
3 Claims. (Cl. 228—4)

This invention relates to the art of joining metal strip in end-to-end relation, and more particularly to an improved method and apparatus for properly relating the strip edges to be joined preparatory to being welded together by either an electric arc or gas flame process. These processes are favored in some applications for various reasons such as lower equipment cost as compared with electric resistance butt-flash methods, and lower equipment cost and the absence of an overlap when compared with electric resistance seam welding methods.

When joining strip in end-to-end relation by either the electric arc or gas torch method, it is desirable that the edges to be joined be accurately related as to parallelism and spacing so that the automatic traverse of the welding head results in complete and uniform fusion with solid metal below the plane of the top surface of the strip and a minimum of excess weld metal above said plane. In most applications such excess weld metal must be removed by scarfing or grinding. Normally, it is desired that the strip be joined as rapidly as possible and accordingly the electric arc process is much favored even though the rapid traverse of the arc welding head requires precision in the alignment and spacing of the edges to be joined to obtain consistently uniform results.

It has been heretofore proposed to achieve the indicated required accuracy of edge alignment and spacing prior to welding by integrating a shear with the welding apparatus whereby the strip lengths are clamped prior to trim shearing of the edges and remain clamped as the clamps are controllably moved relatively toward each other for proper spacing of the edges. Since at this stage of the operational cycle the clamping devices can have only rectilinear relative movement because of their mechanical mountings, parallelism of the edges is insured regardless of whether the shear has only a single pair of blades or two spaced parallel pairs of blades. While these machines are highly successful, their physical embodiments become rather cumbersome when designed for thick stock due to the heavy forces required for shearing and the necessity of retracting the shear blades out of the paths of travel of the clamps and welding mechanism.

The primary object of the present invention is to provide a practical method and simplified inexpensive apparatus whereby heavy gauge metal strip may be satisfactorily and rapidly joined in end-to-end relation by electric arc or gas torch fusion welding without requiring the edge trimming shear to be incorporated in the welder assembly. The invention allows the strip ends to be square-sheared by a conventional shearing device positioned either forwardly of or remote from the welding fixture. Heretofore, this arrangement has not been practical due to the difficulty encountered in effecting at the welding station the required combinational longitudinal alignment, gap setting, and maintenance of precise parallelism of the edges to be welded. The difficulty arises primarily from the fact that flat-lying heavy-gauge strip cannot be either manually or easily skewed in the plane of the strip.

In accordance with the teaching of my invention, the above object is accomplished in part by mounting the traversing welder assembly having the usual entry and exit strip clamps for pivotal movement about a vertical axis as well as for longitudinal movement so that the transverse linear path of movement of the welder head may be precisely aligned with the sheared tail edge of a first or leading strip length lying horizontally in the apparatus. Upon the welder assembly being so properly skewed, the exit clamp may be closed. Secondly, I provide, in addition to the welder entry clamp and closely in advance thereof, a manipulating clamp which is operative to tightly grip the leading portion or head end of a subsequent horizontally disposed strip length and which is so mounted and powered that the leading edge of this subsequent strip length may be moved longitudinally, transversely, and/or skewed in the plane of the strip to accurately relate this leading edge to the trailing edge of the first strip length. Thereafter, the entry clamp of the welding assembly may be closed to permit initiation of the welding traverse.

Another object of the invention is the provision, in apparatus of the general kind described above, of a simple yet effective arrangement of controlling the spacing or gap between the two properly related contiguous edges of the first and second strip lengths. In some welding processes the accuracy of this spacing is quite important, and in the apparatus of my invention this accurate spacing may be readily accomplished by controlling a back-off or skewing of the manipulating clamp after same has been maneuvered to bring the leading edge of the subsequent strip length into line contact or at an angle with the trailing edge of the first strip length which at that time is held in the exit strip clamp of the welding assembly.

The above and other objects and advantages of the invention will become more apparent upon consideration of the following specification and accompanying drawing wherein there is disclosed a preferred embodiment of the invention.

In the drawing:

FIGURE 1 is a side elevation, partly in section, of assembled apparatus constructed in accordance with the principles of my invention; and FIGURE 2 is a plan view of the apparatus of FIGURE 1.

In the drawing, reference numeral 10 designates a base which would normally be fixed with respect to the plant floor. This base 10 is elongated in the direction of strip travel and slideably mounts for longitudinal movement thereon a pair of sub-bases 11 and 12. Sub-base 11 has a first horizontally disposed pad 13 and a higher longitudinally spaced pad 14. Resting on the pad 13 is a welding assembly 15 having a base member 16 pivotally connected to the sub-base 11 by a vertical pivot pin 17. Base member 16 carries a centrally disposed welding platen 18 and a pair of downwardly acting strip clamps 19 and 20, the former of which will be hereinafter referred to as the entry clamp while the clamp 20 will hereinafter be referred to as the exit clamp. Suitable means, such as the double-acting cylinders 21 are carried by the base member 16 to actuate the clamps 19 and 20 and, if desired, suitable centering guides, not shown, may be provided to align transversely the strip to be clamped by the exit clamp 20.

Base members 16 carries, outward of the clamping assemblies 19 and 20, vertically disposed and pedestals 22 and 23 interconnected by a rod 24 and a parallel bar 25. Slideably mounted on the members 24 and 25 is the welding head 26 of the apparatus which may be either a gas welding torch or an electric arc welding device but which is preferably of the electric arc type employing a consumable electrode thus having means to automatically feed a welding wire. Also, this welding head, which may be of known construction, will preferably also be supplied with means to conduct suitable inert gases to the welding area. Also interconnecting the pedestals 22 and 23 and journaled therein is a screw 27 having a threaded interconnection with a projection on the mounting means for the head 26. Screw 27 is arranged to be driven by a motor 28 through a gear reduction 29, and it will be understood that this apparatus moves the welding head 26 along the line of weld at a controlled uniform speed to join the strip held by the clamps 19 and 20.

When welding heavy stock, particularly, in end-to-end relation, considerable weld metal may remain above and below the plane of the joined strip, and it is common practice to remove this by trimming or grinding. Apparatus for performing this operation or any other apparatus which may be used to work on the joined strip may conveniently be supported on the pad 14 as schematically indicated at 30.

Sub-base 11 is arranged to be controllably and longitudinally moved on the base 10 by suitable means such as the hydraulic cylinder 30 which is mounted in the base 10 and suitably connected to a lug 31 depending from the structure of this sub-base. The purpose of this feature is to allow the welding assembly 15 to be quickly and precisely related to the sheared tail end of a strip length 32 which has been stopped in approximate position. It should be understood that it is common practice in strip joining apparatus to provide rollers or other supports and guides to permit the strip to flow through the apparatus when all the clamps thereof are released. Further, pinch rolls, also not shown, positioned ahead of and behind the strip joining apparatus, are provided to start and stop the strip lengths in approximate proper position for welding. With the strip length 32 stopped in approximately proper position and centered (if a centering device is employed) the next step is to manipulate the welding assembly so that the sheared trailing end of the strip length 32 is accurately and properly positioned with respect to the path of travel of the particular welder employed. This relative positioning may be accomplished either by the use of stops or gauges, not shown, or it may be determined simply by sighting along an adjacent edge of the strip clamp 20. However accomplished, the longitudinal relation may be effected by metering oil to one end or the other of the cylinder 30. In addition to this first adjustment, it is almost always necessary (in a case of wide strip particularly) to make a further skewing adjustment to insure that the trailing sheared edge of the strip length 32 will be precisely parallel with the path of travel of the welding head as is necessary to achieve uniform high quality welds. To effect this second adjustment, I provide a horizontal longitudinally disposed hydraulic cylinder 33 which is conveniently carried on a shelf, not shown, extending outwardly from the sub-base 11 and which has its rod connected to a lug 34 extending outwardly from the member 16. Cylinder 33 is also of the double-acting type so that the member 16 and consequently the weld clamps and head can be rotated in either direction about the pivot pin 17 to bring the path of movement of the welding head into exact parallelism with the sheared tail end of the strip length 32 as will be understood. Upon completion of the above described two adjustments, the welding exit clamp 20 is closed.

Mounted for transverse sliding movement on the sub-base 12 is a further base member 35 having an upper pad 36 on which rests a clamp comprised of a lower platen assembly 37 and an upper platen 38. The clamp assembly 37, 38 is pivoted onto base member 35 by a vertical pin 39, and a third hydraulic cylinder 40, similar in mounting and purpose to the cylinder 33, is provided to rotate the clamp assembly 37, 38 about the pivot pin 39. Base member 35, and consequently the clamping assembly 37, 38 is moved transversely on the sub-base 12 by a fourth hydraulic cylinder 41 which again is double-acting and is provided with means, not shown, to meter the flow of fluid to its opposite ends as desired. Upper platen 38 is raised and lowered by a pair of double-acting cylinders 42 which are housed within the platen structure 37 outwardly of the path of strip travel. Of course, in accordance with known design, suitable equalizing means, not shown, is provided to insure the parallel up and down movement of the platen 38; and the same is also true as regards the cylinders 21 and the clamping platens 19 and 20.

To move the sub-base 12 longitudinally along the base 10, I provide a double-acting cylinder 43 which is preferably housed within the base 10 which has one protruding end of its rod connected to a lug 44 depending from the structure 12. For a purpose to be later described, the opposite protruding end of the rod of cylinder 43 is arranged to engage an adjustable stop 45. The clamp comprised of the platens 37, 38 and interconnected mechanisms will hereinafter be referred to as a manipulating clamp, and its purpose and operation will now be described.

In the normal operation of the combined apparatus and with the welder 15 properly related to the sheared tail end of strip length 32 and the exit clamp 20 closed, the next succeeding strip length 46 may now be fed into the apparatus through the normally opened clamp 37, 38 and the open entry clamp 19. Clamp 37, 38 is now closed and the flow of fluid to cylinders 40, 41 and 43 is now so controlled that the leading edge of the subsequent strip length 46 is maneuvered—longitudinally, transevrsely, and angularly, as required—to bring this leading edge into line contact or to a predetermined angular gap with the trailing edge of the strip length 32. If the particular welding process used or the character of the workpieces does not require any spacing or gap between the edges during the welding process, the entry clamp 19 may be closed at once and the welding cycle initiated. As regards the latter, it will be understood that during positioning of the strip preparatory to the welding cycle the welding head 26 will be to one side of the strip in position for quick traverse across the work to effect the joint. If, however, the welding process or work requires a gap between the edges, the clamp 19 is left open and the screw 45 is first moved inwardly to engage the rod of cylinder 43 and then backed off a distance corresponding to the gap dimension desired.

While I have shown, for illustration purposes, the stop 45 in the form of a hand-wheel-operated screw, it should be understood that in actual practice remotely-controlled means operated from the control pulpit would be employed to control this back-off by the clamp 37, 38 and consequently of the strip length 46. However the control is accomplished, it will be understood that after the line contact or angular gap between the strip edges to be welded is established and the back-off stop is set, the cylinder 43 is energized to so retract the clamp 37, 38 after which the entry clamp 19 is closed and the welding cycle initiated.

It should now be apparent that I have provided improved apparatus for joining metal strip in end-to-end relation which accomplishes the objects initially set out. I have also provided an improved method for manipulating the strip lengths to be joined relative to the joining apparatus. These improvements greatly simplify the joining apparatus entirely separate from the welding machine and which may be of more or less standard design specifically constructed for shearing metal sheets and strip. This overall arrangement is particularly advantageous when dealing with the heavier gauges since then the incorporation of heavy shears in the welding apparatus greatly complicates the design of such apparatus and makes the same rather expensive to build.

Having thus described my invention what I claim is:

1. Apparatus for joining metal strip in end-to-end relation comprising a normally fixed base positioned below and extending longitudinally of the path of travel of the strip through the apparatus, a first sub-base slideably mounted for longitudinal movement on said fixed base and mounting a welding assembly operative to join striy lengths in end-to-end relation, means for moving said first sub-base longitudinally on said fixed base, said assembly having entry and exit strip clamps as well as a welding head movable transversely therebetween said clamps, said assembly being pivotally mounted on said first sub-base for swinging movement about a vertical axis whereby said assembly may be accurately related longitudinally of and parallel with the trailing end of a stopped first strip length which may thereafter be secured by said exit clamp, means to move said welding head transversely between said clamps, a second sub-base slideably mounted for longitudinal movement on said fixed base and mounting a manipulating strip clamp, means for moving said second sub-base longitudinally on said fixed base, and said manipulating strip clamp being pivotally mounted on said second sub-base for swinging movement about a vertical axis and having means for effecting said swinging movement whereby the leading end of a succeeding strip length secured in said manipulating clamp may be accurately related longitudinally of and parallel or at an angle with said trailing end of said first strip length after which said succeeding strip length may be engaged by said entry clamp preparatory to welding said first and succeeding strip lengths together.

2. Apparatus according to claim 1 further characterized in that said second sub-base comprises a lower member engaging said fixed base and an upper member pivotally supporting said manipulating clamp, said upper member being mounted for sliding movement on said lower member in a direction transversely of said path, and means to slideably move said upper member relative to said lower member.

3. Apparatus according to claim 1 further including an adjusting stop to limit the movement of said second sub-base in a direction away from said first sub-base and the strip held in said exit clamp whereby after the leading end of said succeeding length of strip held in said manipulating clamp is brought into line contact or at an angle with the trailing end of the strip held in said exit clamp said strip lengths may be separated a predetermined distance to provide a proper welding gap therebetween.

References Cited by the Examiner

UNITED STATES PATENTS

| | | | |
|---|---|---|---|
| 1,123,330 | 1/15 | Lloyd | 29—493 |
| 2,110,529 | 3/38 | Rossignol et al. | 113—133 |
| 2,203,151 | 6/40 | Iverson | 113—123 |
| 2,222,168 | 11/40 | Brooks | 226—143 |
| 2,358,144 | 9/44 | Catlett | 113—133 |
| 2,406,310 | 8/46 | Agule | 29—493 |
| 2,657,660 | 11/53 | Crowe | 29—493 |
| 3,057,056 | 10/62 | Foley et al. | 113—123 |

FOREIGN PATENTS 1,109,075 9/55 France.

CHARLES W. LANHAM, Primary Examiner.

JOHN F. CAMPBELL, Examiner.